US012637085B2

(12) United States Patent
Han et al.

(10) Patent No.: US 12,637,085 B2
(45) Date of Patent: May 26, 2026

(54) UWB-BASED INTENTION DETECTION FOR VEHICULAR APPLICATIONS

(71) Applicant: GM Global Technology Operations LLC, Detroit, MI (US)

(72) Inventors: Zijun Han, Rochester Hills, MI (US); Jinzhu Chen, Troy, MI (US); Fan Bai, Ann Arbor, MI (US); Paul E. Krajewski, Troy, MI (US); Aaron Adler, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 18/613,780

(22) Filed: Mar. 22, 2024

(65) Prior Publication Data

US 2025/0296574 A1      Sep. 25, 2025

(51) Int. Cl.
| | |
|---|---|
| B60W 40/08 | (2012.01) |
| G06V 20/58 | (2022.01) |
| H04W 4/02 | (2018.01) |

(52) U.S. Cl.
CPC ............. B60W 40/08 (2013.01); G06V 20/58 (2022.01); H04W 4/023 (2013.01); B60W 2420/403 (2013.01); B60W 2420/408 (2024.01)

(58) Field of Classification Search
CPC .......... B60W 40/08; B60W 2420/408; B60W 2420/403; G06V 20/58; G06V 10/255;
(Continued)

(56) References Cited

U.S. PATENT DOCUMENTS

| | | | |
|---|---|---|---|
| 2012/0232795 A1* | 9/2012 | Robertson .......... | G01C 21/3837 |
| | | | 706/46 |
| 2014/0095176 A1* | 4/2014 | Kim ................... | H04N 21/6543 |
| | | | 704/275 |

(Continued)

FOREIGN PATENT DOCUMENTS

| | | |
|---|---|---|
| DE | 102018130876 A1 | 6/2020 |
| DE | 102020215728 A1 | 6/2021 |

OTHER PUBLICATIONS

Position Error Bound for UWB Localization in Dense Cluttered Environments (Year: 2007).*

(Continued)

*Primary Examiner* — Fadey S. Jabr
*Assistant Examiner* — Faris Asim Shaikh
(74) *Attorney, Agent, or Firm* — Vivacqua Crane, PLLC

(57) ABSTRACT

A method for vehicle user prediction includes receiving, in real time, Ultra-wideband (UWB) sensor data from UWB sensors. The UWB sensors include UWB and a UWB tag. The method further includes tracking, in real time, a motion of the UWB tag using the UWB sensor data to determine whether the vehicle user is approaching the vehicle and determining a real-time location of the UWB tag relative to the vehicle using a Bayesian estimation, UWB sensor data, and the motion of the UWB tag. The method also includes predicting, using a machine learning model, an intention of the vehicle user using the motion of the UWB tag and the real-time location of the UWB tag relative to the vehicle and commanding an actuator of the vehicle, using a controller of the vehicle, to actuate in response to predicting the intention of the vehicle user.

20 Claims, 3 Drawing Sheets

(58) Field of Classification Search
CPC ........ G06V 20/52; G06V 10/26; G06V 20/56;
H04W 4/023; G06T 2207/20084; G06T
1/00; G06N 3/049
See application file for complete search history.

(56) References Cited

U.S. PATENT DOCUMENTS

| | | | | |
|---|---|---|---|---|
| 2015/0020558 | A1* | 1/2015 | Williams | ............ E05B 73/0011 |
| | | | | 70/18 |
| 2017/0234053 | A1* | 8/2017 | Myers | ..................... E05F 15/73 |
| | | | | 340/426.15 |
| 2018/0190283 | A1* | 7/2018 | Xun | ......................... G10L 15/22 |
| 2018/0290627 | A1 | 10/2018 | Hariri et al. | |
| 2020/0013411 | A1* | 1/2020 | Kumar | .................... G10L 17/24 |
| 2020/0066078 | A1* | 2/2020 | Huschenbett | ........... G01S 13/76 |
| 2020/0186970 | A1 | 6/2020 | Dekovich et al. | |
| 2021/0213909 | A1* | 7/2021 | Petersson | ............... B60R 25/31 |
| 2022/0024415 | A1 | 1/2022 | Wu et al. | |
| 2022/0030383 | A1* | 1/2022 | Hasegawa | ............ B60R 25/245 |
| 2022/0141621 | A1* | 5/2022 | Shah | .................. G07C 9/00896 |
| | | | | 705/13 |
| 2022/0289141 | A1 | 9/2022 | Shah | |
| 2022/0291374 | A1* | 9/2022 | Ryu | ....................... H01Q 23/00 |
| 2022/0292973 | A1* | 9/2022 | Orlando | ................... G08G 1/16 |
| 2023/0154454 | A1* | 5/2023 | Pottier | ................... G06F 21/31 |
| | | | | 704/231 |
| 2023/0175305 | A1* | 6/2023 | Gorenzweig | ............. B60J 5/06 |
| | | | | 49/31 |
| 2023/0234538 | A1 | 7/2023 | Golsch et al. | |
| 2023/0373440 | A1* | 11/2023 | Cheikh | ................ B60R 25/245 |
| 2023/0401387 | A1* | 12/2023 | Alexander | ............. G06F 40/30 |
| 2024/0042965 | A1* | 2/2024 | Oguz | ................. B60R 25/2018 |
| 2024/0253595 | A1* | 8/2024 | Papanikolaou | ........ G06V 20/56 |

OTHER PUBLICATIONS

Interleave Division Multiple Access Robust Anti-Collision Protocol for UWB RFID system in Non-Gaussian impulsive channel (Year: 2014).*

* cited by examiner

400

402

404

406

408

410

UWB-BASED INTENTION DETECTION FOR VEHICULAR APPLICATIONS

INTRODUCTION

The present disclosure relates to systems and methods for UWB-based intention detection for vehicular applications.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicles typically include features that can be activated using user commands. To activate vehicle features, vehicle users may, for example, utter voice commands or physically control a knob or a push a button. It is desirable, however, to predict the vehicle user's intentions and activate the vehicle features based on the predicted vehicle user's intentions.

SUMMARY

The present disclosure describes a method for vehicle user prediction. The method includes receiving, in real time, Ultra-wideband (UWB) sensor data from a plurality of UWB sensors inside a vehicle. The present disclosure further describes a system for vehicle user prediction. The system includes a plurality of UWB sensors inside a vehicle. The plurality of UWB sensors includes a plurality of UWB anchors each disposed in a fixed position inside the vehicle and at least one UWB tag that is not in a fixed position relative to the vehicle. The UWB tag is part of the mobile device. A vehicle user is carrying the mobile device. The method includes tracking, in real time, a motion of the UWB tag using the UWB sensor data to determine whether the vehicle user is approaching the vehicle. Further, the method includes determining a real-time location of the UWB tag relative to the vehicle using a Bayesian estimation, UWB sensor data, and the motion of the UWB tag. Also, the method includes predicting, using a machine learning model, an intention of the vehicle user using the motion of the UWB tag and the real-time location of the UWB tag relative to the vehicle. Moreover, the method includes commanding an actuator of the vehicle, using a controller of the vehicle, to actuate based on the intention of the vehicle user previously predicted. The method described in this paragraph improves vehicle technology by anticipating and executing a vehicular actuator action desired by the vehicle user (without the vehicle user's command input) as predicted by a machine learning model based on, among other things, the vehicle user's real-time location and movements.

The present disclosure further describes a system for vehicle user prediction. The system includes a plurality of UWB sensors inside a vehicle. The plurality of UWB sensors includes a plurality of UWB anchors each disposed in a fixed position inside the vehicle and at least one UWB tag that is not in a fixed position relative to the vehicle. The UWB tag is part of the mobile device. A vehicle user is carrying the mobile device. The system further includes a controller in communication with the plurality of UWB sensors. The controller is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
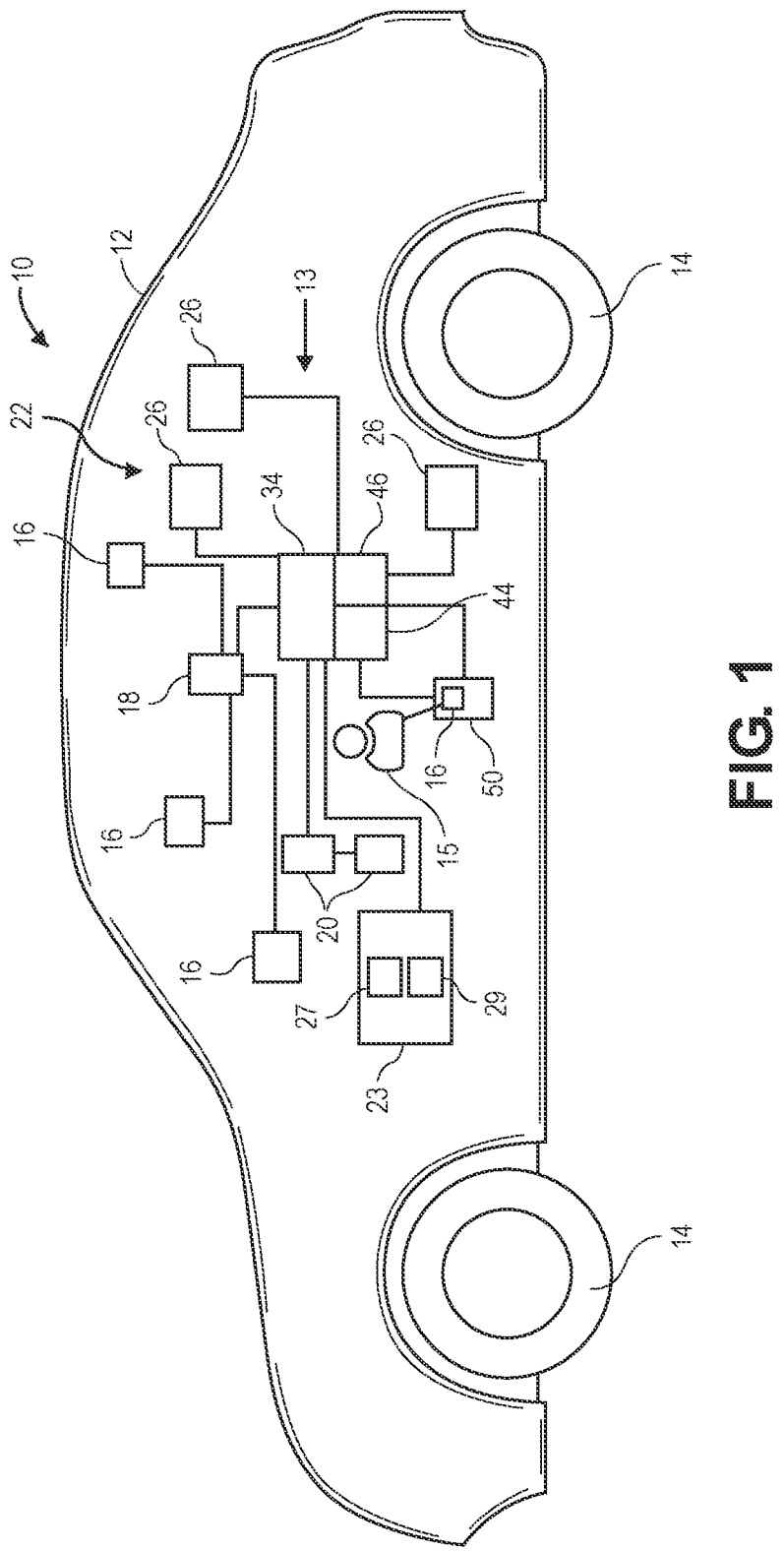
FIG. 1 is a schematic diagram of a vehicle including a system for UWB-based in-vehicle 3D localization of mobile devices.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a body 12 and a plurality of wheels 14 coupled to the body 12. The body 12 defines a passenger compartment 22. The vehicle 10 may be an autonomous vehicle. In the depicted embodiment, the vehicle 10 is depicted in the illustrated embodiment as a sedan, but it should be appreciated that other vehicles including trucks, coupes, sport utility vehicles (SUVs), recreational vehicles (RVs), etc., may also be used.

A system 13 may be part or work together with the vehicle 10. The system 13 may be referred to as a system for UWB-based intention detection for vehicular applications and may include a controller 34. The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 2) as described in detail below.

The instructions may include one or more separate programs, each of which comprises an ordered listing of executable instructions for implementing logical functions. The instructions, when executed by the processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

The vehicle 10 further includes a plurality of ultrawideband (UWB) sensors 16 coupled to the vehicle body 12. The UWB sensors 16 that are coupled to the vehicle 10 serve as UWB anchors and are therefore in a fixed position relative to the vehicle 10. Specifically, the UWB sensors 16 that are coupled to the vehicle 10, such that these UWB sensors 16 remain stationary relative to the vehicle 10. Any suitable fastener, such as screws, bolts, among others, may be used to fix the UWB sensors 16 to the vehicle body 12. Each of the UWB sensors 16 may be configured as chipsets including a UWB transceiver. The UWB sensors 16 are in communication with the controller 34 and use two-way ranging to locate a mobile device 50. The mobile device 50 includes an UWB sensor 16 that serves as a UWB tag. The UWB sensor 16 of the mobile device 50 may be configured as a chipset including an UWB transceiver. The mobile device 50 may be smart phone, a tablet, a key fob, or any other device that is not physically connected to the vehicle 10 and includes the UWB sensor 16. In the present disclosure, the term "mobile device" is a piece of portable electronic equipment that can communicate with another device at least through UWB signals. The UWB sensor 16 that functions as a UWB tag initializes the ranging message, calculates the distance between the UWB tag and each of the UWB anchors, and publishes these distances and the location information in real-time. The UWB anchors listen to the UWB signals transmitted by the UWB tags and provides feedback. The vehicle 10 may further include a Message Queuing Telemetry Transport (MQTT) gateway 18 in communication with the UWB sensors 16. The MQTT gateway 18 collects the ranging and location messages from the UWB tag. The MQTT gateway 18 is in communication with the controller 34.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays, one or more microphones 29 (e.g., a microphone array) and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a person. Accordingly, the controller 34 is configured to receive inputs from the user via the user interface 23. The user interface 23 is also configured to output messages via the display and/or speaker 27. For example, the user interface 23 may output a message.

The vehicle 10 further includes one or more actuators 26 in communication with the controller 34. The actuators 26 control one or more vehicle features such as, but not limited to, the propulsion system, the transmission system, the steering system, radio, air-conditioning system, passenger door, driver door, trunk, door locks, one or more haptic actuators, and the brake system of the host vehicle 10. In various embodiments, the vehicle features may further include interior and/or exterior vehicle features such as, but are not limited to, doors, a trunk, and cabin features such as air, music, lighting, entertainment system, etc.

The vehicle 10 may further include one or more vehicle sensors 20 that sense internal vehicular conditions or external environmental conditions. The vehicle sensors 20 may include, but are not limited to, lidars, speedometers, radars, Global Positioning System (GPS) transceivers, odometers, one or more cameras (e.g., optical cameras and/or thermal cameras, such as a rear camera and/or a front camera), steering angle sensor, ultrasonic sensors, one or more inertial measurement units (IMUs) and/or other sensors 20. The vehicle sensors 20 are in communication with the controller 34 and may therefore transmit sensor data to the controller 34.

Figures 2, 3, 4:
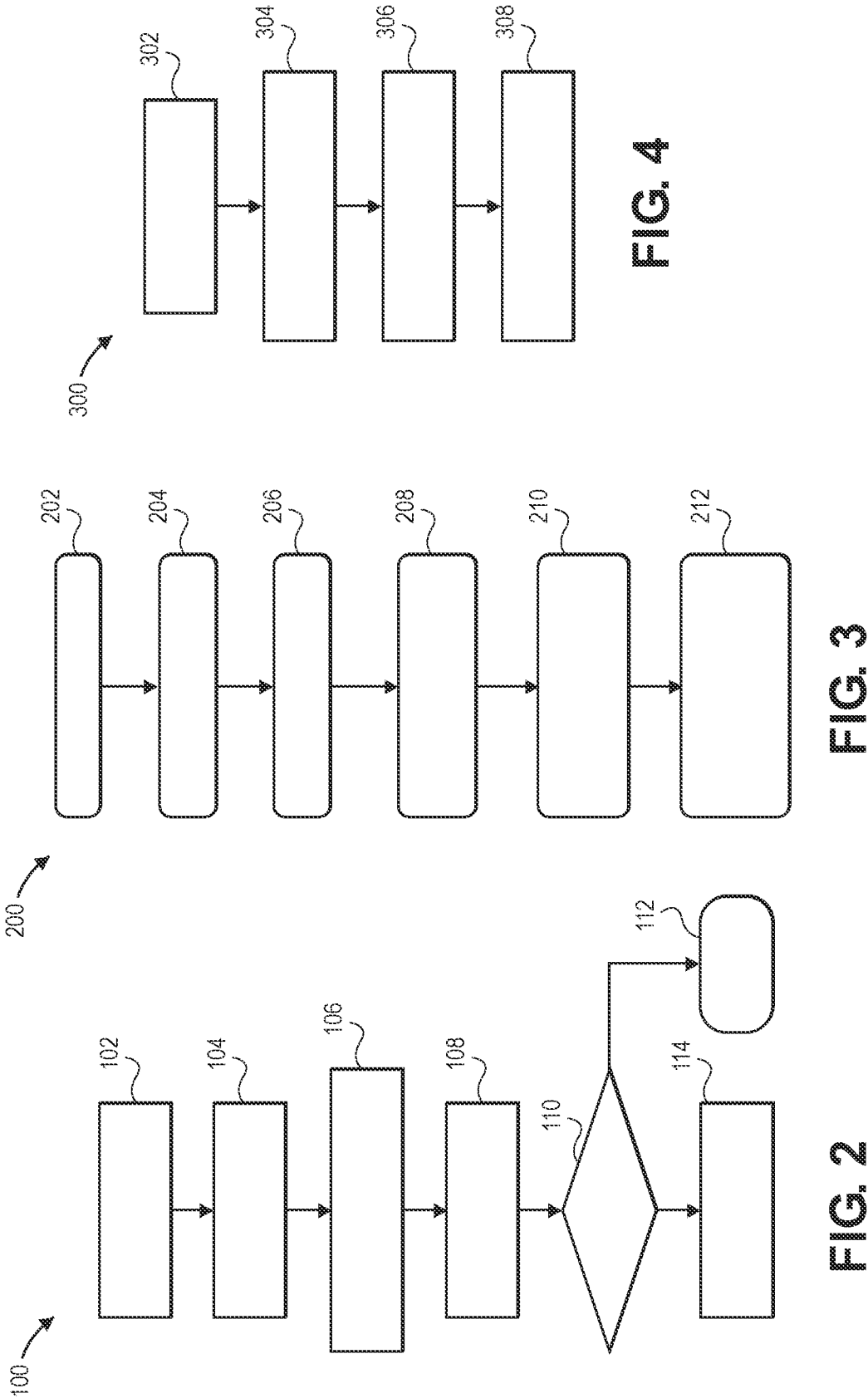
FIG. 2 is a flowchart of a method for UWB-based intention detection for vehicular applications.
FIG. 3 is a flowchart of a process for determining whether the vehicle user 15 is moving toward or away from the vehicle.
FIG. 4 is a flowchart of a process for tracking the motion of the UWB tag.

FIG. 2 is a flowchart of a method 100 for UWB-based intention detection for vehicular applications. The method 100 begins at block 102. At block 102, the controller 34 receives, in real-time, input data. The input data includes Ultra-wideband (UWB) sensor data from a plurality of UWB sensors 16 inside a vehicle. The UWB sensors 16 includes a plurality of UWB anchors each disposed in a fixed position inside the vehicle 10 and at least one UWB tag that is not in a fixed position relative to the vehicle 10. The UWB tag is part of the mobile device 50. The UWB sensor data includes a location information about the UWB anchors and a distance from the UWB tag to each of the UWB anchors. A vehicle user 15 is carrying the mobile device 50. Accordingly, the vehicle user 15 may move the mobile device 50 away or toward the vehicle 10. In addition to the UWB sensor data, the input data may include vehicle sensor data received from the vehicle sensors 20. As non-limiting examples, the input data may include one or more images from one or more cameras of the vehicle 10 and context data (e.g., real-time GPS location from one or more GPS transceivers), etc. The image data includes one or more images of an environment surrounding the vehicle 10. The controller 34 may detect one or more objects being carried by the vehicle user 15. Further, the controller 34 may classify the objects being carried by the vehicle user 15 using, for instance, a You Only Look Once (YOLO) object detection system. The controller 34 may determine that the object being carried by the vehicle user is a baggage and, in response, command the trunk of the vehicle 10 to open. Further, the controller 34 may map the behavior of the vehicle user 15 using the real-time GPS location of the mobile device 50. After receiving the input data, the method 100 continues to block 104.

At block 104, the controller 34 extracts features from the input data. In other words, the controller 34 performs feature construction based on the input data. As discussed in detail below, the feature construction step may result in different outputs. For example, the output of the feature construction step may determine whether the vehicle user 15 is approaching or moving away from the vehicle 10 based on the UWB sensor data. In another example, the output of the feature construction may be the real-time location and/or motion tracking of the vehicle user 15 based on the UWB sensor data. In yet another example, the output of the feature construction may be behavior mapping of the vehicle user based on context data and/or object detection and classification based on the image data. As discussed below, the input data may include audio data. The audio data includes a voice command received by one or more microphones 29 of the vehicle 10 and/or the mobile device 50. After the feature construction, the method 100 continues to block 106.

At block 106, the controller 34 executes a machine learning model to predict an intention of the vehicle user 15 using the input data and the features extracted from the input data. The machine learning model may be a decision tree, such as a regression tree. It is envisioned that the machine learning model may be trained offline to make predictions based on the combined features from multiple sensor inputs. Then, the method 100 continues to block 108.

At block 108, the controller 34 outputs the vehicle user prediction. As non-limiting examples, the vehicle user prediction may include one or more of the following: (a) the vehicle user 15 is moving toward one of the passenger door of the vehicle 10 (b) the vehicle user 15 is moving toward the driver door of the vehicle 10; (c) the vehicle user 15 is moving toward the trunk of the vehicle 10; and (d) the vehicle user 15 is moving away from the vehicle 10. Usually, a command is associated with the vehicle user prediction. Then, the method 100 continues to block 110.

At block 110, the controller 34 determines whether the vehicle user 15 has decided to override a command associated with the vehicle user prediction. To do so, the controller 34 receives an override command from the vehicle user 15. The vehicle user 15 may provide this override command by physically pressing a button or uttering a voice command. The microphones 29 of the vehicle 10 and/or the mobile device 50 may receive and process the voice commands. Upon receipt of the override command, the controller 34 determines that the vehicle user 15 has decided to override the command associated with the vehicle user prediction, and the method 100 proceeds to block 112. At block 112, the method 100 ends. If the controller 34 determines that vehicle user 15 has not decided to override the command associated with the vehicle user prediction due to the absence of an override command, the method 100 proceeds to block 114.

At block 114, the controller 34 commands one or more actuators 26 to actuate in response to predicting the intention of the vehicle user 15. The actuator command is dependent on the vehicle user prediction determined by the machine learning mode. For example, the controller 34 may command the trunk to open in response to determining that the vehicle user 15 is approaching (i.e., moving toward) the trunk of the vehicle 10. In another example, the controller 34 may command the door locks to lock a door (e.g., passenger door, driver door, etc.) of the vehicle 10 in response to determining that the vehicle user 15 is moving away from the vehicle 10. In yet another example, the controller 34 may command the passenger door to open in response to determining that the vehicle user 15 is moving toward the passenger door. Further, the controller 34 may command the driver door to open in response to determining that the vehicle user 15 is moving ward the driver door.

FIG. 3 is a flowchart of a process 200 for determining whether the vehicle user 15 is moving toward or away from the vehicle 10 and may be part of the method 100 described above. The process 200 begins at block 202. At block 202, the controller 34 receives, in real-time, UWB sensor data from the UWB sensors 16. As discussed above, UWB sensors 16 one or more UWB anchors and at least one UWB tag. The UWB anchors are each disposed in a fixed position inside the vehicle 10. The UWB tag is not in a fixed position relative to the vehicle 10 and is part of the mobile device 50. The vehicle user 16 may carry the mobile device 50 outside of the vehicle 10. The UWB sensor data includes a location information about the UWB anchors and a distance from the UWB tag to each of the UWB anchors. Then, the process 200 continues to block 204.

At block 204, the controller 34 uses the UWB sensor data to determine the distance from the UWB tag to each of the UWB anchors over time. Next, the process 200 continues to block 206. At block 206, the controller 34 extracts features from the UWB sensor data and the distances previously determined at block 204. Then, the controller 34 proceeds to block 208.

At block 208, the UWB sensor data and the distances previously determined at block 204 are fed to a classifier, such as a support vector machine (SVM). Then, the controller 34 uses the classifier (e.g., SVM) to determine whether the vehicle user 15, who is carrying the mobile device 50, is moving toward the vehicle 10, moving away from the vehicle 10, or is stationary relative to the vehicle 10. The process 200 then proceeds to block 210.

At block 210, the controller 34 predicts the vehicle user intention based on the UWB sensor data, the distances previously determined at block 204, and/or whether the vehicle user 15 is approaching the vehicle 10, moving away from the vehicle 10, or stationary relative to the vehicle 10. Next, the process 200 continues to block 212. At block 212, the controller 34 outputs the vehicle user prediction determined at block 210.

FIG. 4 is a flowchart of a process 300 for tracking the motion of the UWB tag and may be part of the method 100 described above. The process 300 uses a Bayesian estimation to determine a real-time location of the UWB tag relative to the vehicle 10 (and/or specific targets within the vehicle 10) based on UWB sensor data, and the motion of the UWB tag. The process 300 begins at block 302. At block 302, the controller 34 receives the potential targets located at different locations of the vehicle 10. As non-limiting examples, the potential targets may be actuators of the vehicle 10, such as the passenger door, the trunk and/or the driver door. Then, the process 300 continues to block 304. At block 304, the controller 34 receives real-time UWB sensor data. Then, the process 300 continues to block 306.

Block 306 entail initialization. At initialization, the controller 34 determines the initial state of one or more targets based on the UWB sensor data. The initial state may include an initial location of one or more targets at the initial timestamp based on the observation by the UWB sensors 16. The initial location at the initial timestamp may have coordinate (e.g., (x, y) coordinates). The controller 34 may also determine initial vehicle-user intention probabilities based on the initial location at the initial timestamp. The method 300 then proceeds to block 308.

At block 308, the controller 34 gets the previous location of the target, which may be expressed with the following equation:

$$S_i = [L_i^x, L_i^y]$$

where:

S$_i$ is the location of the UQB tag at timestamp i;

$$L_i^x$$

is the x-axis coordinate of the location S$_i$ of the UWB tag at timestamp i; and $$L_i^y$$

is the y-axis coordinate of the location S$_i$ of the UWB tag at timestamp i.

The controller 34 then gathers the UWB sensor measurements and estimates the location of the targets through triangulation. The sensed location of the targets provided by the UWB wireless sensor network (WSN) may be expressed with the following equation:

$$Z_i = [Z_i^x, Z_i^y]$$

where:

Z$_i$ is the sensed location of the target at timestamp i;

$$Z_i^x$$

is the x-axis coordinate of the sensed location Z$_i$ of the UWB tag at timestamp i; and $$Z_i^y$$

is the y-axis coordinate of the sensed location Z$_i$ of the UWB tag at timestamp i.

The controller 34 then updates the state of the target by considering the sensor measurement and gaussian noise. To do so, the controller 34 may use the following equation:

$$S_{i+1} = [L_{i+1}^x + N_i^x, L_{i+1}^y + N_i^y]$$

where:

S$_{i+1}$ is the location of the UWB tag at timestamp i+1;

$$N_i^x$$

is the x-axis sensor noise (simulated by the Gaussian noise) at timestamp i;

$$N_i^y$$

is the y-axis sensor noise (simulated by the Gaussian noise) at timestamp i;

$$L_{i+1}^x$$

is the x-axis coordinate of the location S$_i$ of the UWB tag at timestamp i+1; and $$L_{i+1}^y$$

is the y-axis coordinate of the location S$_i$ of the UWB tag at timestamp i+1.

The controller 34 then calculates the angle between the location and the second, subsequent location of the UWB tag at the next timestamp. To do so, the controller 34 may use the following equation:

$$\theta_{i+1} = \arctan\left(\frac{L_{i+1}^y - L_i^y}{L_{i+1}^x - L_i^x}\right)$$

where:

$\theta_{i+1}$ is the real moving angle between the location of the UWB tag at timestamp i+1 and one of the targets;

$$L_i^x$$

is the x-axis coordinate of the location S$_i$ of the UWB tag at timestamp i; and $$L_i^y$$

is the y-axis coordinate of the location S$_i$ of the UWB tag at timestamp i;

$$L_{i+1}^x$$

is the x-axis coordinate of the location S$_i$ of the UWB tag at timestamp i+1; and $$L_{i+1}^y$$

is the y-axis coordinate of the location S$_i$ of the UWB tag at timestamp i+1.

The controller 34 then calculates the angle to each target based on the previous location. To do so, the controller 34 may use the following equations:

$$G^k = [L_k^x, L_k^y]$$

$$\theta^k = \arctan\left(\frac{L_k^y - L_i^y}{L_k^x - L_i^x}\right)$$

where:

k is one of the targets;

$G^k$ is the location of the k target;

$$L_k^x$$

is the x-axis coordinate of the location of the target k;

$$L_k^y$$

is the y-axis coordinate of the location of the target k;

$\theta$k is the angle from the UWB to the target k;

$$L_i^x$$

is the x-axis coordinate of the location $S_i$ of the UWB tag at timestamp i; and $$L_i^y$$

is the y-axis coordinate of the location $S_i$ of the UWB tag at timestamp i.

The controller 34 then calculates the angle offset or deviation between the real and the potential moving angle using the following equation:

$$\delta\theta_{i+1}^k = \theta^k - \theta_{i+1}$$

where:

$\theta$k is the angle from the UWB to the target k;

$\theta_{i+1}$ is the real moving angle between the first location of the UWB tag at timestamp i and the second location of the UWB tag at timestamp i+1; and $$\delta\theta_{i+1}^k$$

is the angle offset or deviation between the real and the potential moving angle.

The controller 34 then updates the probability that the vehicle user 15 is approaching at least one of the targets. To do so, the controller 34 may use the following equation:

$$p_{i+1}^k = p_i^k * \cos\left(\frac{\delta\theta_{i+1}^k + 1}{2}\right),$$

then normalize the probability with $$\sum_{j=1}^k \left(p_{i+1}^k\right) = 100\%.$$

where:

k is a target;

$$\delta\theta_{i+1}^k$$

is the angle offset or deviation between the real and the potential moving angle.

$$p_i^k$$

is the probability that the UWB tag (and therefore the vehicle user 15) is approaching the target k a present timestamp i;

$$p_{i+1}^k$$

is the probability that the UWB tag (and therefore the vehicle user 15) is approaching the target k a timestamp i+1.

The controller 34 then selects any target k with the probability that the vehicle user 15 is approaching that target k $$\left(p_{i+1}^k\right)$$

that is greater than fifty percent as the output of the vehicle user intention in the current step.

Figure 5:
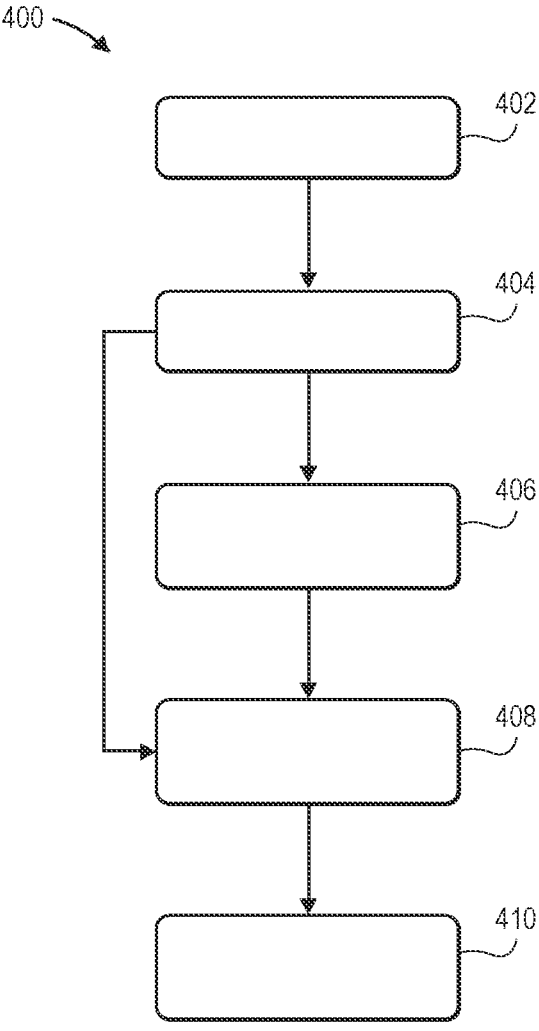
FIG. 5 is a flowchart of a machine learning process.

FIG. 5 is a flowchart of a machine learning process 400 for predicting the vehicle user intention. The process 400 uses a decision tree (i.e., regression tree) and begins at block 402. At block 402, the controller 34 receives the input data. As discussed above, the input data may include UWB sensor data, context data, and image data. Next, the process 400 continues to block 404. At block 404, the controller 34 performs data imputation. The data imputation step handles missing features by setting default values. To do so, the coefficient between features may be studied. The missing feature data may be replaced with commonly related feature data. For example, the trunk angle is highly related to an approach (i.e., moving toward the vehicle 10). Then, the process 400 continues to block 406.

At block 406, the controller 34 performs leaf node distribution of the decision tree. Then, the process 400 continues to block 408. At block 408, the controller 34 perform decision tree pruning to minimize the number of samples required to be at a leaf node. The controller 34 may use the following equations for decision tree pruning:

$$\mu = \frac{\sum_{j=1}^M C_j^k}{M}$$

$$\delta^2 = \frac{\sum_{j=1}^M \left(C_j^k - \mu\right)^{\wedge}2}{M}$$

$$\text{Min(leaf)} = \mu - 2\delta$$

where:

$$C_j^k$$

is the number of samples derived from the first trained decision tree;

k is an intention category;

j is a leaf node.

M is the total number of leaf nodes;

μ is the average of the leaf node distribution;

δ is the variance of the leaf node distribution; and

Min(leaf) is the minimum number of samples required to be at a leaf node.

Then, the process 400 continues to block 410. At block 410, the controller 34 makes predicts the vehicle user intention using the decision tree. To do so, the controller 34 may use the Gain or Gini index for decision making on each split. The Gini index considers a binary split for each attribute and uses the following equations:

$$\mathrm{Gini}(D) = \sum_{i=1}^{m} P_i^2$$

where:

Gini(D) is the Gini index, which measures the probability for a random instance being misclassified when chosen randomly;

D is the entire dataset;

m is the total number of targets (i.e., goals);

$P_i$ is the ratio of the $i_{th}$ target to the total number of observations.

If a binary slip on an attribute A partitions the dataset D into data subset D1 and data subset D2, then the Gini index of D is:

$$\mathrm{Gini}(D) = \frac{|D_1|}{|D|}\mathrm{Gini}(D_1) + \frac{|D_2|}{|D|}\mathrm{Gini}(D_2)$$

where:

Gini(D) is the Gini index of a feature A when splitting the dataset D into two subjects $D_1$ and $D_2$ based on this specific feature;

$D_1$ is a first data subset;

$D_2$ is a second data subset; and

D is the entire dataset.

Given a certain feature set, the controller 34 selects the feature with the lowest Gini index to split the current node in the decision tree.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for vehicle user prediction, comprising:
receiving, in real time, Ultra-wideband (UWB) sensor data from a plurality of UWB sensors and input data, wherein at least one of the plurality of UWB sensors is disposed inside a vehicle, the plurality of UWB sensors includes a plurality of UWB anchors each disposed in a fixed position inside the vehicle and at least one UWB tag that is not in a fixed position relative to the vehicle, the UWB tag is part of a mobile device, and the UWB sensor data includes a location information about the UWB anchors and a distance from the UWB tag to each of the UWB anchors, and a vehicle user is carrying the mobile device, and where the input data includes objects being carried by the vehicle user, where the objects are classified using a controller using a You Look Only Once (YOLO) object detection system;
tracking, in real time, a motion of the UWB tag using the UWB sensor data and at least one target including an actuator of the vehicle to determine whether the vehicle user is approaching the vehicle; and
determining a real-time location of the UWB tag relative to the vehicle using a Bayesian estimation, UWB sensor data, and the motion of the UWB tag, where determining includes determining an initial state of at least one target based on the UWB sensor data using triangulation and updating a state of the target by considering UWB sensor data and gaussian noise;
predicting, using a machine learning model including a regression tree, an intention of the vehicle user using the motion of the UWB tag and the real-time location of the UWB tag relative to the vehicle, wherein predicting includes calculating an angle between a location and a second, subsequent location of the UWB tag at a next timestamp, calculating an angle to each target based on a previous location, calculating an angle offset between a real angle and a potential moving angle, updating a probability that the vehicle user is approaching at least one of the targets, and selecting any of the targets with a probability that the vehicle user is approaching the target that is greater than fifty percent as an output of an intention of the vehicle user; and
commanding an actuator of the vehicle, using a controller of the vehicle, to actuate based on the intention of the vehicle user previously predicted.

2. The method of claim 1, wherein the machine learning model is a decision tree model, the actuator is a trunk of the vehicle, and commanding the actuator of the vehicle to actuate in response to predicting the intention of the vehicle user includes commanding the trunk of the vehicle to open in response to predicting the intention of the vehicle user.

3. The method of claim 2, further comprising:
determining that the vehicle user is approaching the vehicle using the distance from the UWB tag to each of the UWB anchors, the real-time location of the UWB tag relative to the vehicle, and the motion of the UWB tag; and
wherein commanding the trunk of the vehicle to open in response to predicting the intention of the vehicle user includes commanding the trunk of the vehicle to open in response to determining that the vehicle user is approaching the vehicle.

4. The method of claim 1, wherein the machine learning model is a decision tree model, the actuator is a door of the vehicle, and commanding the actuator of the vehicle to actuate in response to predicting the intention of the vehicle user includes commanding the door of the vehicle to open in response to predicting the intention of the vehicle user.

5. The method of claim 4, further comprising:
determining that the vehicle user is approaching the vehicle using the distance from the UWB tag to each of the UWB anchors, the real-time location of the UWB tag relative to the vehicle, and the motion of the UWB tag; and
wherein commanding the door of the vehicle to open in response to predicting the intention of the vehicle user includes commanding the door of the vehicle to open in response to determining that the vehicle user is approaching the vehicle.

6. The method of claim 1, wherein the UWB sensor data is part of an input data, the method further includes receiving, by the controller of the vehicle, the input data, the input data further includes image data received from a camera of the vehicle, and the image data includes an image of an environment surrounding the vehicle, the method further comprises detecting an object being carried by the vehicle user, the method further comprises classifying the object being carried by the vehicle user, and predicting, using the machine learning model, the intention of the vehicle user using the motion of the UWB tag and the real-time location of the UWB tag relative to the vehicle includes predicting, using the machine learning model, the intention of the vehicle user using the motion of the UWB tag, the real-time location of the UWB tag relative to the vehicle, and the input data.

7. The method of claim 6, wherein the actuator is a trunk of the vehicle, and the method further comprises:
determining that the object being carried by the vehicle user is a baggage; and
commanding the actuator of the vehicle to actuate in response to predicting the intention of the vehicle user includes commanding the trunk of the vehicle to open in response to: (a) determining that the object being carried by the vehicle user is the baggage and (b) determining that the vehicle user is approaching the vehicle.

8. The method of claim 6, wherein the input data includes context data, the context data includes a Global Positioning System (GPS) location of the mobile device, and predicting, using the machine learning model, the intention of the vehicle user using the motion of the UWB tag and the real-time location of the UWB tag relative to the vehicle includes predicting, using the machine learning model, the intention of the vehicle user using the motion of the UWB tag, the real-time location of the UWB tag relative to the vehicle, the image data, and GPS location of the mobile device.

9. The method of claim 8, wherein the input data includes audio data, the audio data includes a voice command received by a microphone, and the method further comprises:
determining whether the voice command is contrary to the intention of the vehicle user predicted by the machine learning model; and
refraining from commanding the actuator of the vehicle, using the controller of the vehicle, to actuate in response to predicting the intention of the vehicle user in response to determining that the voice command is contrary to the intention of the vehicle user predicted by the machine learning model.

10. The method of claim 1, wherein the actuator is a door of the vehicle, and the method further comprises:

determining that the vehicle user is moving away from the vehicle using the UWB sensor data;

wherein commanding the actuator of the vehicle to actuate in response to predicting the intention of the vehicle user includes locking the door of the vehicle in response to determining that the vehicle user is moving away from the vehicle.

11. A system for vehicle user prediction, comprising:

a plurality of UWB sensors, wherein at least one of the plurality of UWB sensors is disposed inside a vehicle, the plurality of UWB sensors includes a plurality of UWB anchors each disposed in a fixed position inside the vehicle and at least one UWB tag that is not in a fixed position relative to the vehicle, and the UWB tag is part of a mobile device;

a controller in communication with the plurality of UWB sensors, wherein the controller is programmed to:

receive, in real time, Ultra-wideband (UWB) sensor data from a plurality of UWB sensors inside a vehicle and input data, the plurality of UWB sensors includes a plurality of UWB anchors each disposed in a fixed position inside the vehicle and at least one UWB tag that is not in a fixed position relative to the vehicle, the UWB tag is part of the mobile device, and the UWB sensor data includes a location information about the UWB anchors and a distance from the UWB tag to each of the UWB anchors, and a vehicle user is carrying the mobile device, and where the input data includes objects being carried by the vehicle user, where the objects are classified using a controller using a You Look Only Once (YOLO) object detection system;

track, in real time, a motion of the UWB tag using the UWB sensor data and at least one target including an actuator of the vehicle to determine whether the vehicle user is approaching the vehicle; and determine a real-time location of the UWB tag relative to the vehicle using a Bayesian estimation, UWB sensor data, and the motion of the UWB tag, where to determine includes determining an initial state of at least one target based on the UWB sensor data using triangulation and updating a state of the target by considering UWB sensor data and gaussian noise;

predict, using a machine learning model including a regression tree, an intention of the vehicle user using the motion of the UWB tag and the real-time location of the UWB tag relative to the vehicle, wherein to predict includes calculating an angle between a location and a second, subsequent location of the UWB tag at a next timestamp, calculating an angle to each target based on a previous location, calculating an angle offset between a real angle and a potential moving angle, updating a probability that the vehicle user is approaching at least one of the targets, and selecting any of the targets with a probability that the vehicle user is approaching the target that is greater than fifty percent as an output of an intention of the vehicle user; and command an actuator of the vehicle, using a controller of the vehicle, to actuate based on the intention of the vehicle user previously predicted.

12. The system of claim 11, wherein the machine learning model is a decision tree model, the actuator is a trunk of the vehicle, and the controller is programmed to command the trunk of the vehicle to open in response to predicting the intention of the vehicle user.

13. The system of claim 12, wherein the controller is programmed to:

determine that the vehicle user is approaching the vehicle using the distance from the UWB tag to each of the UWB anchors, the real-time location of the UWB tag relative to the vehicle, and the motion of the UWB tag; and command the trunk of the vehicle to open in response to determining that the vehicle user is approaching the vehicle.

14. The system of claim 11, wherein the machine learning model is a decision tree model, the actuator is a door of the vehicle, and the controller is programmed to command the door of the vehicle to open in response to predicting the intention of the vehicle user.

15. The system of claim 14, wherein the controller is programmed to:

determine that the vehicle user is approaching the vehicle using the distance from the UWB tag to each of the UWB anchors, the real-time location of the UWB tag relative to the vehicle, and the motion of the UWB tag; and command the door of the vehicle to open in response to determining that the vehicle user is approaching the vehicle.

16. The system of claim 11, wherein the UWB sensor data is part of an input data, the controller is programmed to receive the input data, the input data further includes image data received from a camera of the vehicle, the image data includes an image of an environment surrounding the vehicle, the controller is programmed to detect an object being carried by the vehicle user, the controller is programmed to classify the object being carried by the vehicle user, and predict, using the machine learning model, the intention of the vehicle user using the motion of the UWB tag, the real-time location of the UWB tag relative to the vehicle, and the input data.

17. The system of claim 16, wherein the actuator is a trunk of the vehicle, and the controller is programmed to:

determine that the object being carried by the vehicle user is a baggage; and command the actuator of the vehicle to actuate in response to predicting the intention of the vehicle user includes commanding the trunk of the vehicle to open in response to: (a) determining that the object being carried by the vehicle user is the baggage and (b) determining that the vehicle user is approaching the vehicle.

18. The system of claim 16, wherein the input data includes context data, the context data includes a Global Positioning System (GPS) location of the mobile device, and the controller is programmed to predict, using the machine learning model, the intention of the vehicle user using the motion of the UWB tag, the real-time location of the UWB tag relative to the vehicle, the image data, and GPS location of the mobile device.

19. A vehicle, comprising:

a vehicle body;

a plurality of UWB sensors inside the vehicle body, wherein the plurality of UWB sensors includes a plurality of UWB anchors each disposed in a fixed position inside the vehicle body, and at least one UWB tag that is not in a fixed position relative to the vehicle body, and the UWB tag is part of a mobile device;

a controller in communication with the plurality of UWB sensors, wherein the controller is coupled to the vehicle body, and the controller is programmed to:

receive, in real time, Ultra-wideband (UWB) sensor data from a plurality of UWB sensors inside a vehicle and input data, the plurality of UWB sensors includes a plurality of UWB anchors each disposed in a fixed position inside the vehicle and at least one UWB tag that is not in a fixed position relative to the vehicle, the UWB tag is part of the mobile device, and the UWB sensor data includes a location information about the UWB anchors and a distance from the UWB tag to each of the UWB anchors, and a vehicle user is carrying the mobile device, and where the input data includes objects being carried by the vehicle user, where the objects are classified using a controller using a You Look Only Once (YOLO) object detection system;

track, in real time, a motion of the UWB tag using the UWB sensor data and at least one target including an actuator of the vehicle to determine whether the vehicle user is approaching the vehicle; and determine a real-time location of the UWB tag relative to the vehicle using a Bayesian estimation, UWB sensor data, and the motion of the UWB tag, where to determine includes determining an initial state of at least one target based on the UWB sensor data using triangulation and updating a state of the target by considering UWB sensor data and gaussian noise;

predict, using a machine learning model including a regression tree, an intention of the vehicle user using the motion of the UWB tag and the real-time location of the UWB tag relative to the vehicle, wherein to predict includes calculating an angle between a location and a second, subsequent location of the UWB tag at a next timestamp, calculating an angle to each target based on a previous location, calculating an angle offset between a real angle and a potential moving angle, updating a probability that the vehicle user is approaching at least one of the targets, and selecting any of the targets with a probability that the vehicle user is approaching the target that is greater than fifty percent as an output of an intention of the vehicle user; and command an actuator of the vehicle, using a controller of the vehicle, to actuate in response to predicting the intention of the vehicle user.

20. The vehicle of claim 19, wherein the machine learning model is a decision tree model, the actuator is a trunk of the vehicle, and the controller is programmed to command the trunk of the vehicle to open in response to predicting the intention of the vehicle user.

* * * * *